July 29, 1947.  G. E. ECKMAN  2,424,807
PIERCING DEVICE FOR FILLING BATTERIES
Filed Sept. 13, 1944
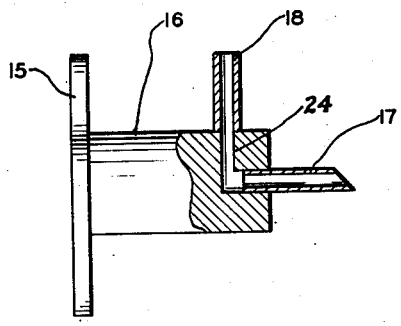
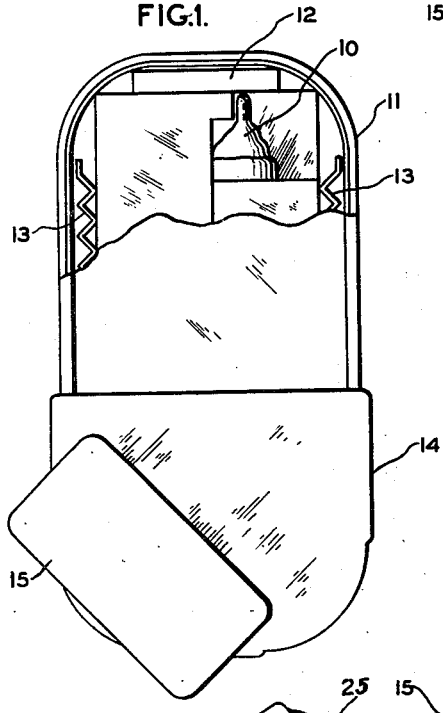
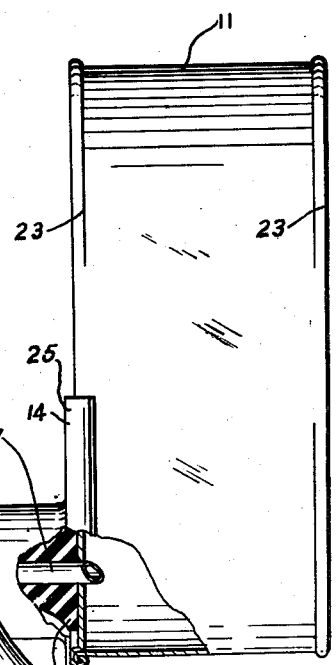
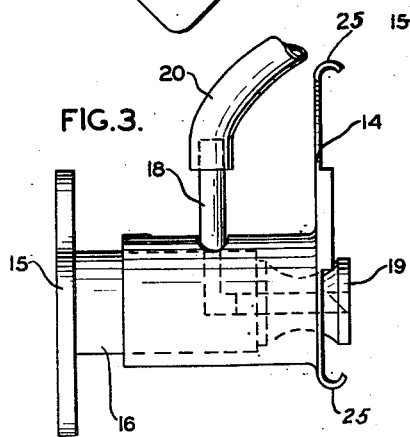
*INVENTOR.*
GEORGE E. ECKMAN
BY
*William D. Hall*
ATTORNEY Patented July 29, 1947

2,424,807

UNITED STATES PATENT OFFICE 2,424,807

PIERCING DEVICE FOR FILLING BATTERIES

George E. Eckman, Oradell, N. J., assignor to American Can Company, New York, N. Y., a corporation of New Jersey Application September 13, 1944, Serial No. 553,862

7 Claims. (Cl. 226—19)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to a method and means of filling very small wet cell batteries as used in radiosonde equipment and more particularly to a can piercing device for vacuum-pack containers.

My application discloses a can piercing device which is an improvement over the one disclosed in the co-pending application of Greenville B. Ellis, Serial No. 552,861.

In certain radiosonde equipment the power is furnished by small wet cell batteries. To prevent electrochemical or electrolytic deterioration these batteries are transported without the acid mixture or electrolyte in them. They are filled in the field just before use and, at full load, have a lifetime of about two hours. The batteries are very small and have tiny openings and were formerly filled by means of a hypodermic needle this method was slow and tedious when performed in the field.

Another method which is now being utilized is to inclose the batteries in a partially evacuated glass container having a glass tip. To fill the batteries the glass tip is submerged in the acid mixture and then broken off. The difference in pressure causes the acid mixture to enter the glass container and incidentally the batteries. It is then necessary to break the glass container for removal of the activated batteries therefrom. This method is objectionable because of the problems of transporting glass and the possibility of injury to the battery or user in breaking the glass for the removal of the batteries.

The principal object of my invention is to provide a piercing device which is simple, compact, easily attached, economical to manufacture and highly efficient.

Referring to the drawings:

Figure 1 is a top view partly broken away of a can piercer implement embodying the invention, applied to a can;

Figure 2 is a side view in section of the piercer shown in Fig. 1;

Figure 3 is a detail of the assembled can piercer;

Figure 4 is a sectional view of the assembled vacuum-pack can and piercing device.

Referring to Figure 1, the batteries 10 are contained within the quasi-rectangular can 11 and are held in place when vacuum-packed by spacer clip board 12 at each end, also held firmly sidewise by a special corrugated spacer 13. The device that embodies this invention includes a guide bracket 14 which is slideably attached to can 11. This bracket is surmounted by a cylindrical sleeve 22 which has a lateral Z-like slot 21 in its wall. The slot enters from the edge at the free or open end of the sleeve, as indicated in Fig. 4. The sleeve is preferably integrally attached to the flat upper surface of the bracket 14. Each side 25 of the bracket 14 is bent to form grippers that will provide the slideable attachment over the rim 23 of the can 11. This complete bracket is used as a guide for a stem 16 having a can piercer 17 and to align it intimately against the surface of the top of the can. The flat plate 15 formed as a handle is attached to the stem 16. The stem 16 is attached to it at right angles. This stem has right-angle passage 24 in it for an intake pipe or tube 18 at one end and the sharpened piercing pipe or tube 17 to be fastened to it at the other end, as indicated in Fig. 2. A flexible tube 20, is provided for attachment to the intake pipe 18.

Referring to Fig. 3, the guide bracket 14 fits slideably over the top of the can 11. The compressible washer 19 is fitted tightly around the piercing pipe or tube 17 in order to maintain an airtight seal for the period of time required for the batteries inside the can 11 to become filled with the electrolyte. The intake pipe or tube 18 is connected for one end of the flexible tube or hose 20 while its other end is immersed in the electrolyte that is to be sucked up. The intake pipe 18 turns with the stem 16, when the plate 15 is turned, and travels in the slot 21.

Referring to Figure 4, in the filling operation the plate 15 is thrust down sharply and given a clockwise twist, so that intake pipe 18, to which the flexible tube or hose 20 is attached, catches in the slot 21 and travels helically forward, the stem 16 compresses the washer 19, making an airtight seal with the can 11, the piercing pipe or tube 17 punctures the vacuum-packed can 11, which contains the batteries 10. The solution then is drawn upwardly from an acid container into and through the flexible tube or hose 20 and passage 24 in the stem 16 and out of the pipe or tube 17 filling the can 11 and the batteries contained therein.

Having thus described my invention, I claim:

1. A piercing implement for a container holding a battery therein comprising, a piercing member mountable on said container and including a stem thereon, said stem having a passage therethrough, an intake pipe attached to said stem on one end of said passage, said pipe being arranged for the attachment of a filling tube thereon, a piercing pipe for piercing and connecting the interior of said container on which said stem is mounted at the other end of said passage, and means for attaching said member to a container and holding same securely thereon having a slot therein for the insertion of said intake pipe to lock thereon and force the piercing pipe into the container.

2. A piercing implement for a container holding an unfilled battery therein under vacuum comprising, a piercing member for said container including a movable stem and handle thereon, said stem having an angular passage therethrough, an intake pipe attached to said stem on one end of said passage, said pipe being arranged for the attachment of a suction tube thereon, a piercing pipe mounted on said stem at the other end of said passage for penetrating the container, means for movably attaching said member to a container and holding same securely thereon having a lateral slot therein for the insertion of said intake pipe to guide, lock said member thereon and force said piercing pipe into the container, and gasket means for making the attachment of said member and container tight.

3. A piercing implement for a container holding an unfilled wet battery therein under vacuum comprising, a piercing member attachable to said container and including a cylindrical stem with a handle thereon, said stem having an erratically contoured passage therethrough, an intake pipe attached to said stem at one end of said passage, said pipe being arranged for the attachment of a suction tube thereon, a piercing pipe mounted on said stem at another end of said passage so as to be connected with said intake pipe, and a bracket for bringing said member against said container and holding same securely thereon having a slot therein for the insertion of said intake pipe to lock said member thereon and force the piercing pipe into the container when said handle is operated.

4. A piercing implement of the class described comprising, a bracket slidable on a container under a vacuum and including a cylindrical sleeve thereon, a stem insertable and reciprocable in said bracket, said stem having a passage directed in plural directions therethrough, an intake pipe attached to said stem and connected with said passage for bringing extraneous liquids thereto, a piercing pipe attached to said stem and connected with another portion of said passage whereby a complete duct is provided between the intake and the piercing pipe, for said liquids to pass therethrough, and means on the bracket having its side portions arranged for gripping the rims of said container to permit the positioning of said piercing pipe thereon so as to provide for the penetration of said container by said piercing pipe and allowing the vacuum to carry the liquids into the container.

5. A piercing implement for rimmed containers holding an unfilled electrolytic generator therein under vacuum comprising, a bracket member having its side portions bent to engage and slide on the rims of said container and hold itself movably but securely thereon, said member including a stem, a hollow cylindrical sleeve with a quasi-Z-formed slot in the wall thereof with an entrance at the free end of the sleeve, said sleeve being substantially at right angles to the plane of said portions engaging said rims, a piercing member adapted for insertion in the sleeve having an internal passage therein opening at plural locations at the periphery and end thereof, a piercing pipe for penetrating the container coupled to the passage at one of its openings, an intake pipe connected at another of said locations for delivering liquids through the intake, passage and piercing pipe into said container, said intake pipe being disposed in said slot so that the movement of the stem therein will induce the stem and piercing pipe to travel towards said container for penetrating same and utilizing the vacuum therein to create a suction through the intake, passage and piercing pipe for filling the container and generator with said liquids.

6. A piercing implement for containers holding empty wet batteries therein under vacuum comprising, a piercing member for penetrating said containers and including a stem and a rotatable handle thereon, said stem having a right angled passage therethrough from a side to an end thereof, an intake pipe attached to said stem at the side end of said passage, said pipe being arranged for the attachment of a liquid-filling tube thereon, a piercing pipe mounted on said stem on the other end of said passage for penetrating the container and bringing the interior thereof in access with said passage, gripper means rotatably mounting said stem within it and arranged for slidably attaching said member to a container in a predetermined manner and holding same securely thereon and having a slot formed therein for the insertion of said intake pipe to lock said stem therein and forcing the piercing pipe into the container when the handle is rotated and provide for filling the container under the action of the vacuum.

7. A piercing implement of the class described comprising, a bracket slidable on a rimmed container and including a hollow cylindrical sleeve with a slot therein and a base with bent grippers for slidably grasping the rims of said container and allowing a longitudinal travel thereon, a stem insertable and guidable in said sleeve, said stem having a passage in plural direction therethrough, an intake pipe connected to said stem for delivering fluids thereto and to said passage and projected through said slot when in place in said sleeve, a piercing pipe attached to said stem and connected with said passage whereby a complete duct is provided between and through the intake pipe and the piercing pipe, and means for operating the stem in the sleeve with the intake pipe in the slot, whereby the operation of the stem will force the piercing pipe into the container and couple the interior of same with the intake pipe to allow the passage of said liquids thereinto.

GEORGE E. ECKMAN.

REFERENCES CITED

The following references are of record in the file of this patent:

UNITED STATES PATENTS

| Number | Name | Date |
| --- | --- | --- |
| 1,104,068 | Norton | July 21, 1914 |
| 1,255,813 | Brew | Feb. 5, 1918 |
| 2,235,951 | Thompson | Mar. 25, 1941 |
| 2,349,303 | Pelosi | May 23, 1944 |
| 1,869,258 | Holland | July 26, 1932 |